INVENTOR.
LYMAN H. WALBRIDGE

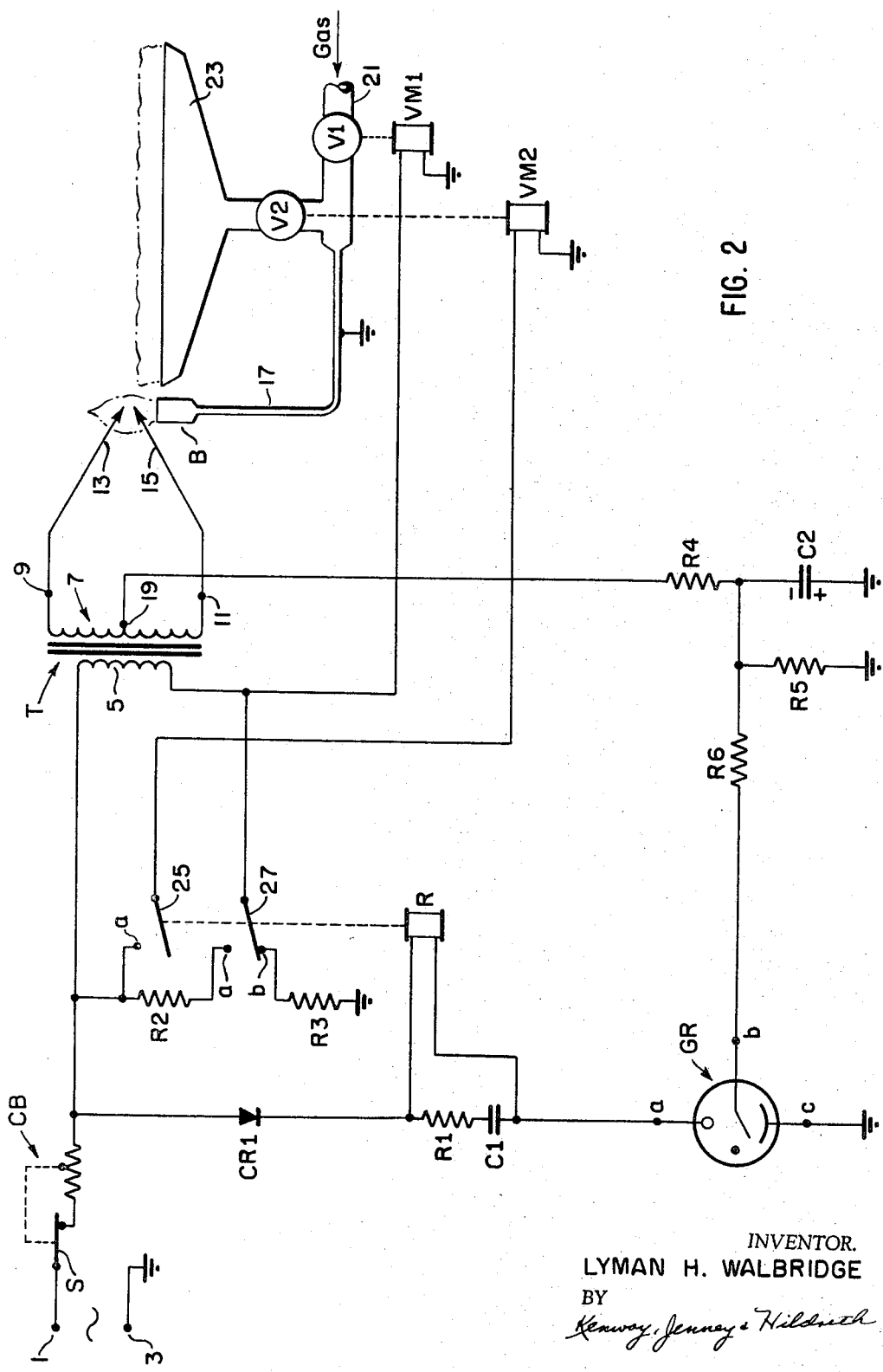

United States Patent Office 3,405,998
Patented Oct. 15, 1968

3,405,998
IGNITION AND FLAME MONITORING CONTROL APPARATUS FOR FUEL BURNERS
Lyman H. Walbridge, Ashland, Mass., assignor to Fenwal Incorporated, Ashland, Mass., a corporation of Massachusetts
Filed June 26, 1967, Ser. No. 648,611
8 Claims. (Cl. 431—25)

ABSTRACT OF THE DISCLOSURE

The invention relates to a flame-monitoring circuit for a fuel burner in which fuel is ignited by electrodes which are energized by a continuously excited transformer. The circuit input terminals are connected to the burner itself and a center tap on the transformer secondary: the circuit responds to full-wave, flame-rectified current flowing to the burner alternately first from one electrode and then from the other. Apparatus is disclosed for reducing the transformer voltage after a flame is detected, and controlling the supply of fuel in response to the output signal from the flame-monitoring circuit. The full specification should be consulted for an understanding of the invention.

---

Figure 1:
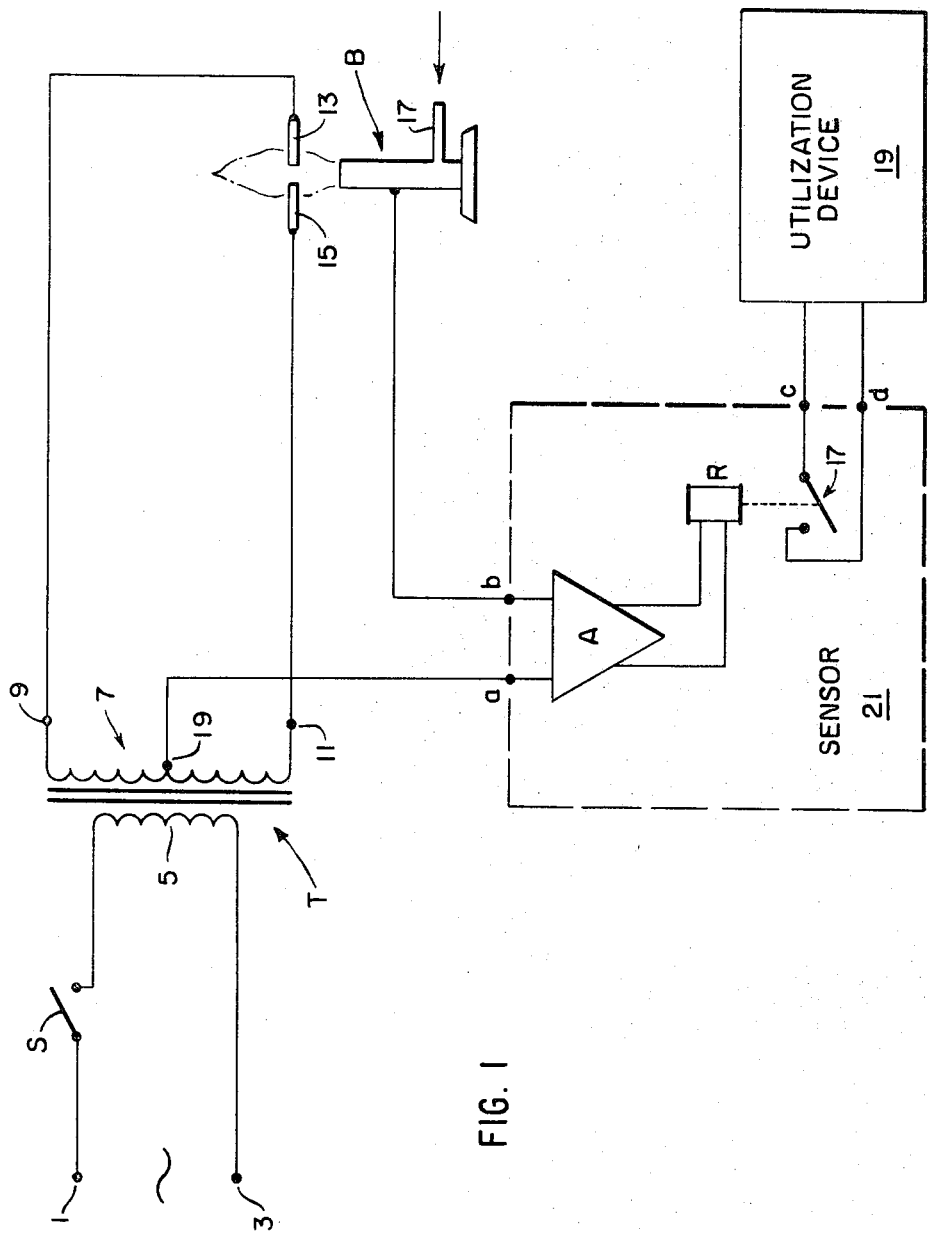

My invention relates to fuel burners, and particularly to a novel electrical ignition and flame monitoring control system for fuel burners.

The safe operation of fuel burners, such as gas burners, oil burners, and the like, requires the use of apparatus for sensing the presence or absence of a flame at the burner. Devices that have been used for the detection of a flame include, among others, photocells, thermocouples, circuits that rely on thermionic emission of an element heated by the flame, and circuits responsive to the conduction of flame-rectified current between an electrode exposed to the flame and another electrode. Thus, a number of available devices are capable of detecting the presence of a flame. However, to make a fuel ignition and control system to standards of safety and reliability that would justify the use of a flame detector, it is generally necessary to measure a number of other variables and conditions, including the integrity of the various components of the measuring apparatus used. The result is generally an expensive and complicated system. The object of my invention is to greatly simplify the apparatus required to indicate both the presence of a flame at a burner and the integrity of the electrical ignition system for the burner.

Briefly, the above and other objects of my invention are attained by a novel combination of a metallic fuel burner and a pair of electrodes located adjacent the burner. By the term "metallic fuel burner" I mean a burner which includes means for making an electrical contact with the flame. The means may be a screen, a wire or indeed the metal burner itself. When the electrodes are excited by applied voltage, sparks jump between them that will ignite fuel emitted from the burner. The electrodes are usually, although not necessarily, excited by the secondary winding of an ignition transformer having a primary winding that is continually excited by an alternating voltage during the period of operation of the burner. The secondary winding of the transformer is provided with a center tap which provides a neutral voltage terminal with respect to the alternating excitation and a sensing circuit has input terminals connected between the center tap and the metallic burner. If the transformer used to provide excitation for the electrodes is not center-tapped, the neutral voltage terminal may be provided by a resistor voltage divider or the like. Such a voltage divider may also be used to establish a neutral voltage terminal if no transformer is used by merely connecting it across the alternating voltage supplied to the electrodes. By this arrangement, during one half cycle of the applied alternating voltage one of the electrodes will be positive with respect to the burner, and on the other half cycle the other electrode will be positive with respect to the burner. When a flame bathes the electrodes, flame-rectified current will flow to the burner alternately from one electrode and the other. The result will be a full-wave rectified current flowing in the sensing circuit. The sensing circuit is arranged, in a manner to be described to produce an output signal when and only when a full-wave rectified current is detected. By this arrangement, not only the proper operation of the ignition circuit, but the presence of a flame, is detected. The resulting signal can be used for a variety of indication or control purposes; for example, as a control signal for continuing the supply of fuel to the burner only so long as the flame is detected and the ignition apparatus is operating properly.

In accordance with a preferred embodiment of my invention, I provide circuit means for lowering the voltage applied to the ignition transformer after a flame has been established and detected by the flame monitoring circuit. Current continues to flow between the ignition electrodes, because the impedance between the electrodes is greatly reduced in the presence of a flame. At the same time, the flame monitoring circuit continues to function. Apparatus is provided for controlling the supply of fuel to the burner in accordance with the signal produced by the flame monitoring circuit, and interrupting the supply of fuel if the flame is extinguished. In this manner, the same electrodes can be used for ignition and flame monitoring in both the pre-ignition and post-ignition modes of operation with immediate switching from one to the other and consequently very little erosion of the electrodes and greatly reduced radio frequency interference.

The apparatus of my invention, and its mode of operation, will be best understood in the light of the following detailed description, together with the illustrative drawing, of a preferred embodiment thereof.

In the drawings

FIG. 1 is a schematic wiring diagram of an electrical ignition and flame monitoring circuit in accordance with my invention; and FIG. 2 is a schematic wiring diagram of an ignition and fuel control system for a fuel burner comprising a pilot burner and a main burner.

Referring to FIG. 1, 1 and 3 are a pair of input terminals adapted to be excited by a source of alternating voltage, such as a conventional 60 cycle, 115 volt source. Terminals 1 and 3 are connected to the primary winding 5 of a conventional ignition transformer T, the circuit including a switch S in series with the power source. The transformer T is provided with a secondary winding 7 having outer terminals 9 and 11. The terminal 9 is connected to an ignition electrode 13, and the terminal 11 is connected to an ignition electrode 15. The electrodes 13 and 15 are located adjacent a metallic burner B, here shown as a conventional Bunsen burner, and are spaced equidistantly from the burner.

The burner B is arranged to be supplied with gas through an inlet pipe 17. When the switch S is closed, it will be apparent that the electrodes 13 and 15 will be excited by alternating current, producing sparks that will ignite fuel emitted from the burner B to produce a flame bathing the electrodes 13 and 15.

The secondary winding 7 of the transformer T is provided with a center tap 19 and the center tap and the metallic burner B are electrically connected to the input terminals $a$ and $b$ of a sensor circuit generally indicated at 21. The sensor 21 may take various forms, but in general, it is a device that will detect the flow of a full-wave rectified current between the center tap 19 and the burner B. As here shown, the sensor comprises an electrical amplifier A having input terminals connected to the terminals a and b, and output terminals connected to the winding of a relay R. The gain of the amplifier is adjusted so that sufficient current to pick up the relay and keep it energized is produced only when full-wave rectified current flows between the input terminals a and b. Additional refinements would be the provision of a low pass filter at the input of the amplifier A, to shunt alternating current components and thereby discriminate against a half-wave recified current, and the provision of a voltage responsive gate, such as a reverse-biased diode or a Zener diode, to positively reject average current below the value indicating full wave rectification.

As shown, the output signal of the sensor 21 is provided by a "front" contact 17 of the relay R, closed only when full wave current is detected. The output terminals c and d of the sensor are connected to any suitable utilization device 19, which may for example, take the form of a control circuit for a valve emitting gas to the burner B.

The operation of the apparatus of FIGURE 1 is as follows. Assume that gas is admitted to the burner B, and the switch S is closed with the terminals 1 and 3 excited by an alternating current. Sparks will exist between the electrodes 13 and 15, and, if the apparatus is operating properly, a flame will be produced. As is known to those skilled in the art, electrodes bathed in a flame are charged with excess electrons present in the ionized gases of the flame. Assuming a half cycle in which the electrode 13 is positive with respect to the center tap 19, there will then exist a driving force that draws additional electrons to the electrode 13, which will ultimately be supplied from the burner B. The input terminal b of the sensor 21 will then become positive with respect to the input terminal a, and a half cycle of flame rectified current will flow from the electrode 13 to the burner B. In general, there will be alternating components, but the average current will be unidirectional. During that half cycle, the electrode 15 will be negative with respect to the center tap 19, and current will not flow between that electrode and the burner B.

During the next succeeding half cycle, flame rectified current will flow from the electrode 15 to the burner B in the manner just discussed. Accordingly, if the apparatus is operating properly, the amplifier A will be energized and the relay R will close its front contacts 17.

Should one of the electrodes 13 and 15 become grounded to the burner, even though sparks might continue to flow, the flame rectified current would flow only on alternate half cycles. The output of the amplifier A in response to this half-wave current would be insufficient to operate the relay. If the electrodes 13 and 15 became connected together, obviously neither could assume a potential that was positive with respect to the center tap. It is equally clear that the device would not produce an output signal if the excitation of the line terminals 1 and 3 were interrupted, if the switch S were open, or if either winding of the transformer were shorted. Accordingly, the signal produced by the sensor 21 is an indication, not only of the presence of a flame, but of the integrity of the ignition circuit for maintaining ignition conditions at the burner should the supply of gas be interrupted, or the gas flame be extinguished.

In FIG. 2 I have shown an embodiment of my invention in which the flame monitoring signal, produced essentially in the manner described in FIG. 1, is employed to sense the flame of a pilot burner and to control the supply of fuel to a main burner. As shown, the pilot burner is arranged to be supplied with gas through a main pipe 21 when a conventional solenoid-operated valve V1 is open. The pilot burner comprises a small burner B as described in connection with FIG. 1, preferably one designed for low heat, easy ignition and reliable flame rectification. Such a burner is preferably one in which the flame burns in contact with most of the surface of the Davies screen, such as a conventional Bunsen burner, a Fisher laboratory burner, or the like. The burner should provide a gas-air mixture that is ignitable without appreciable pre-heating, as by a low energy spark, over the whole top surface of the burner. The main, or high heat, burner is shown at 23, and is supplied with gas only when the valve V1 is open and a second conventional solenoid-operated valve V2 is open.

As shown, the supply pipe 17 for the burner B is connected to ground. The ground symbol is used as a reference and primarily for convenience; it is not necessarily an earth ground, although the latter is preferred.

Input terminals 1 and 3 are arranged to be energized by alternating current in the manner described in connection with FIG. 1. In FIG. 2, the switch S is shown as forming a part of a conventional circuit breaker CB, having a resistance heating element R1 connected in series with the contacts of the switch S which responds to excessive current supplied to the system over a period of time by opening the switch S.

In FIG. 2, the relay R is used to supply one of two operating voltages to the primary winding 5 of the transformer T, depending upon conditions to be described. For this purpose, the relay R is provided with a pair of movable contacts 25 and 27, each engaging a "front" contact a when the relay is energized. A back contact b is associated with the movable contacts 27 to be engaged when the relay is released. The circuits controlled by these contacts will be described after a description of the sensing circuit which controls the energization of the relay.

As in the apparatus of FIG. 1, a sensing circuit for flame-rectified current is provided that has input terminals connected between the center tap 19 of the secondary winding 7 and the burner B. The sensing circuit includes a resistor R4 and a capacitor C2 connected in series between the center tap 19 and ground. If desired, a resistor R5 can be connected between ground and the junction of the resistor R4 and the capacitor C2.

It will be apparent that when full-wave flame rectified current flows between the electrodes 13 and 15 and the burner B, the capacitor C2 will charge to one value, whereas if half-wave rectified current is supplied, it will charge to a lower value.

Time constants determined by the resistors R4 and R5 and the capacitor C2 are selected to determine the response of the system and control the decay time of the voltage across the capacitor if the flame at the burner B is extinguished.

The voltage signal at the junction of the resistor R4 and the capacitor C2 is coupled through a resistor R6 to the control terminal b of a conventional gas relay GR, such as the RCA type 5823. This relay is of the type which, when provided with sufficient positive voltage at its anode a with respect to its cathode c, will conduct heavily between its anode and cathode when and only when provided with a sufficiently high negative starting bias applied to its control terminal b. As will be apparent to those skilled in the art, the gas relay could be replaced by any other conventional electronic switch, such as a solid state switching circuit, if so desired.

The relay R is energized through the diode CR1, and the gas relay GR when ionized. A resistor R1 and capacitor C1 are connected across the winding of the relay R2 to keep it energized between half cycles of energizing current.

The primary winding 5 of the transformer T is energized through the circuit breaker CB, the other side of the winding 5 is connected through the winding of a solenoid VM1, for operating the valve V1, to ground. This circuit is effective to apply full operating voltage to the transformer T, for producing ignition sparks when no flame is present at the burner B, and to open the pilot valve V1 to supply gas to the pilot burner B when the system is energized. With the relay R de-energized, a resistor R3 is connected in parallel with the valve solenoid VM1 over the back contact $b$ engaged by the armature 27 of the relay. This resistor serves to increase the voltage applied across the primary winding 5.

When relay R is energized, its armature 27 engages front contact $a$ to connect a resistor R2 in parallel with the primary winding 5, and remove the resistor R3 from the circuit. The voltage applied to the transformer is thereby reduced, and the valve V1 is kept open. At the same time, the movable contact 25 of the relay R engages the front contact $a$ to supply energizing current to the solenoid VM2 to thereby open the valve V2 and supply gas to the main burner 23.

Operation of the apparatus of FIG. 2 will be discussed on the assumption that line terminals 1 and 3 are initially de-energized, the gas relay GR is non-conducting, the relay R is de-energized, and the valves V1 and V2 are closed. Assuming that terminals 1 and 3 are then energized with alternating current, full operating voltage will be applied to the primary winding 5 of the transformer T and the secondary winding 7 will supply voltage to the electrodes 13 and 15 to cause sparks to be produced between them. At the same time, the pilot valve solenoid VM1 will be energized, opening the valve V1 to supply gas to the burner B. If a flame is produced, full-wave rectified current will flow alternately from the electrodes 13 and 15 to the burner B, causing the capacitor C2 to be charged with the polarity indicated in the drawing. Thereafter, the gas relay GR will conduct on each positive-going half cycle of the terminal 1 with respect to the terminal 3, causing the relay R to be energized and engage its front contacts $a$. The voltage at the transformer primary will then be reduced to a supervisory value, still sufficient to cause current to flow between the electrodes 13 and 15 and the burner B in the presence of a flame. The valve solenoid VM2 will be energized to open the valve V2 and supply gas to the main burner. Should the flame-rectified current charging the capacitor C2 be reduced in any of the ways discussed above, as, for example, if the flame should be extinguished at the burner B, the gas relay GR will not be gated into conduction and the relay R will release, causing the main valve V2 to be closed. The resistive element of the circuit breaker CB is preferably selected so that if full current is drawn by the transformer T for longer than a time adequate to produce an indication that a flame is present, the circuit breaker will open the switch S and de-energize the system, causing the valve V1 to be closed. Thus, the system is fully protected against excessive emission of gas should any component failures occur.

While I have described my invention with respect to the details of a preferred embodiment thereof, many changes and variations will be apparent to those skilled in the art upon reading my description, and such can obviously be made without departing from the scope of my invention.

Having thus described my invention, what I claim is:

1. In combination, a fuel burner including an electrically conductive portion in contact with the flame, a pair of ignition electrodes adjacent said burner, a source of alternating voltage connected across said electrodes to produce ignition sparks between said electrodes, means providing a neutral terminal with respect to said alternating voltage source, and circuit means having a terminal connected to said neutral terminal and a terminal connected to the electrically conductive portion of said burner and responsive to flame-rectified current continuously flowing to said burner alternately from one and the other of said electrodes to produce a full wave rectified signal indicating the presence of a flame bathing said electrodes.

2. The combination defined in claim 1 which includes means for supplying said ignition electrodes with an alternating voltage from said source of sufficient magnitude to cause sparks therebetween in the absence of flame during a first time period and means responsive to said signal indicating the presence of flame for reducing the magnitude of said alternating voltage applied to said electrodes during a second time period.

3. The combination defined in claim 1 which includes means for supplying fuel to said burner during a first period independent of the presence of said full wave rectified signal, and means responsive to said full wave rectified signal for maintaining said fuel supply to said burner during a second time period subsequent to said first period.

4. In combination, a metallic fuel burner, a pair of ignition electrodes adjacent said burner, an ignition transformer having a secondary winding connected across said electrodes and a primary winding adapted to be excited by alternating voltage to produce ignition sparks between said electrodes, a center tap on said secondary winding, and circuit means having a terminal connected to said center tap and a terminal connected to said burner and responsive to flame-rectified current continuously flowing to said burner alternately from one and the other of said electrodes to produce a full-wave rectified signal indicating the presence of a flame bathing said electrodes.

5. The combination defined in claim 4 which includes means for supplying the primary winding of said ignition electrodes with an alternating voltage of sufficient magnitude to cause sparks between said electrodes during a first time period and means responsive to said full wave rectified signal for reducing the magnitude of said alternating voltage applied to said primary winding during a second time period.

6. The combination defined in claim 4 which includes means for supplying fuel to said burner during a first time period independent of the presence of said full wave rectified signal, and means responsive to said full wave signal for maintaining the fuel supply to said burner during a second time period subsequent to said first period.

7. In combination with a pair of ignition electrodes adjacent a pilot fuel burner having a metallic portion in contact with the flame from said burner, said pilot burner being associated with a main burner, means for connecting said ignition electrodes with an alternating voltage, means providing a neutral terminal with respect to said alternating voltage, first fuel supply means operable when energized to supply fuel to said pilot burner, and second fuel supply means operable when energized to supply fuel to said main burner, fuel ignition and valve control means comprising circuit means operable when energized to connect a source of alternating voltage to said means connected to said ignition electrode to produce ignition sparks between said electrodes and energize said first fuel supply means to supply fuel to said pilot burner, and sensing circuit means having input terminals connected to said neutral terminal and said pilot burner and responsive to flame rectified current continuously flowing to the pilot burner alternately from one electrode and the other for energizing said second fuel supply means when a flame is present at said pilot burner.

8. The combination defined in claim 7 in which said means connecting said electrodes to said alternating voltage source includes an ignition transformer.

References Cited

UNITED STATES PATENTS 2,581,188   1/1952   Hibbard _____ 158—28
2,817,395   12/1957  Lutz et al. _____ 158—28

FREDERICK KETTERER, *Primary Examiner.*